US011157536B2

(12) United States Patent
Akbulut et al.

(10) Patent No.: US 11,157,536 B2
(45) Date of Patent: Oct. 26, 2021

(54) TEXT SIMPLIFICATION FOR A QUESTION AND ANSWER SYSTEM

(71) Applicant: International Business Machines Corporation, Armonk, NY (US)

(72) Inventors: Muhtar B. Akbulut, Waban, MA (US); Donna K. Byron, Petersham, MA (US); Priscilla S. Moraes, Pflugerville, TX (US); David D. Taieb, Charlestown, MA (US); Steven D. Wood, Edinburgh (GB)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 15/145,437

(22) Filed: May 3, 2016

(65) Prior Publication Data
US 2017/0323204 A1    Nov. 9, 2017

(51) Int. Cl.
*G06F 16/338* (2019.01)
*G06F 16/33* (2019.01)
(Continued)

(52) U.S. Cl.
CPC .......... *G06F 16/338* (2019.01); *G06F 16/334* (2019.01); *G06F 16/3329* (2019.01); *G06N 5/025* (2013.01); *G06N 20/00* (2019.01)

(58) Field of Classification Search
CPC ............. G06F 17/2775; G06F 17/2785; G06F 17/30522; G06F 17/3053; G06F 17/30598; G06F 17/30657; G06F 17/30684; G06F 17/30705; G06F 17/30864; G06F 17/30979; G06F 19/24; G06N 7/005; G06N 5/02;
(Continued)

(56) References Cited

U.S. PATENT DOCUMENTS 5,835,900 A    11/1998 Fagg, III et al.
8,260,839 B2    9/2012 Rao
(Continued)

OTHER PUBLICATIONS

Soricut et al., Automatic Question Answering: Beyond the Factoid, 2006. (Year: 2006).*

(Continued)

*Primary Examiner* — Kamran Afshar
*Assistant Examiner* — Marshall L Werner
(74) *Attorney, Agent, or Firm* — Terrile, Cannatti & Chambers, LLP; Stephen A. Terrile

(57) ABSTRACT

A method, system and computer-usable medium are disclosed for the use of a text simplification in a question answering (QA) system to improve ingestion quality and QA performance. A source corpus is processed to generate a parsed source corpus, which in turn is processed to generate a shadow corpus of simplified text. The parsed source corpus and the shadow corpus are then processed to generate derived data resources. A user query is processed to generate a set of merged candidate answer variants which are in turn processed to generate a corresponding converged feature vector representing each merged candidate answer variant. Feature values associated with each converged feature vector are then used to rank the merged candidate answer variants. A ranked set of merged candidate answer variants is then provided to the user.

20 Claims, 4 Drawing Sheets

(51) Int. Cl.
*G06F 16/332* (2019.01)
*G06N 20/00* (2019.01)
*G06N 5/02* (2006.01)

(58) Field of Classification Search
CPC ........ G06N 5/025; G06N 5/047; G10L 15/16;
G10L 15/18; G10L 15/1815; G10L
15/1822; G10L 13/08; G10L 17/06;
G06K 9/00288; G06K 9/00442; G06K
9/00718
See application file for complete search history.

(56) References Cited

U.S. PATENT DOCUMENTS

| | | | |
|---|---|---|---|
| 2002/0138249 A1* | 9/2002 | Kanevsky | G02B 27/017 704/2 |
| 2015/0220852 A1 | 8/2015 | Hatami-Hanza | |
| 2016/0034514 A1* | 2/2016 | Singhal | G06F 16/9535 707/706 |

OTHER PUBLICATIONS

Temnikova, Irina, Text Complexity and Text Simplification in the Crisis Management Domain, 2012. (Year: 2012).*
1910 Cuba Hurricane Wikipedia pages, Simple English (Sep. 8, 2015) and English (Oct. 18, 2018) versions, pp. 1-13, Sep./Oct. 2015. (Year: 2015).*
Gondek et al., A framework for merging and ranking of answers in DeepQA, IBM J Res & Dev, vol. 56, No. 3/4 Paper 14, May/Jul. 2012. (Year: 2012).*
Petersen et al., Text Simplification for Language Learners: A Corpus Analysis, SLaTE 2007, Oct. 2007. (Year: 2007).*
Zamfir, Cristina, A Java implementation of a Question Answering system based on Conditional Knowledge in client-server technology, pp. 162-167, Jan. 2010. (Year: 2010).*
Woodsend et al., WikiSimple: Automatic Simplification of Wikipedia Articles, Proceedings of the Twenty-Fifth AAAI Conference on Artificial Intelligence, pp. 927-932, 2011. (Year: 2011).*
Zajic et al., Sentence Compression as a Component of a Multi-Document Summarization System, Proceedings of the 2006 Document Understanding Conference (DUC-2006) at NLT/NAACL 2006, Jun. 2006. (Year: 2006).*
Chali et al., Complex Question Answering: Unsupervised Learning Approaches and Experiments, Journal of Artificial Intelligence Research 35 (2009), p. 1-47, May 2009. (Year: 2009).*
Steinberger et al., Evaluation Measures for Text Summarization, Computing and Informatics, vol. 28, pp. 1001-1026, Mar. 2009. (Year: 2009).*
R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
C. Poornima et al., Rule based Sentence Simplification for English to Tamil Machine Translation System, International Journal of Computer Applications (0975-8887), vol. 25, No. 8, Jul. 2011, http://www.ijcaonline.org/volume25/number8/pxc3874147.pdf.
B. Klebanov et al., Text Simplification for Information-Seeking Applications, On the Move to Meaningful Internet Systems 2004: CoopIS, DOA, and ODBASE, 2004, http://clair.si.umich.edu/si767/papers/Week06/SentenceSimplification/Beigman.pdf.
K. Woodsend et al., WikiSimple: Automatic Simplification of Wikipedia Articles, Proceedings of the Twenty-Fifth AAAI Conference on Artificial Intelligence, 2011, https://www.aaai.org/ocs/index.php/AAAI/AAAI11/paper/viewFile/3505/3968.

* cited by examiner

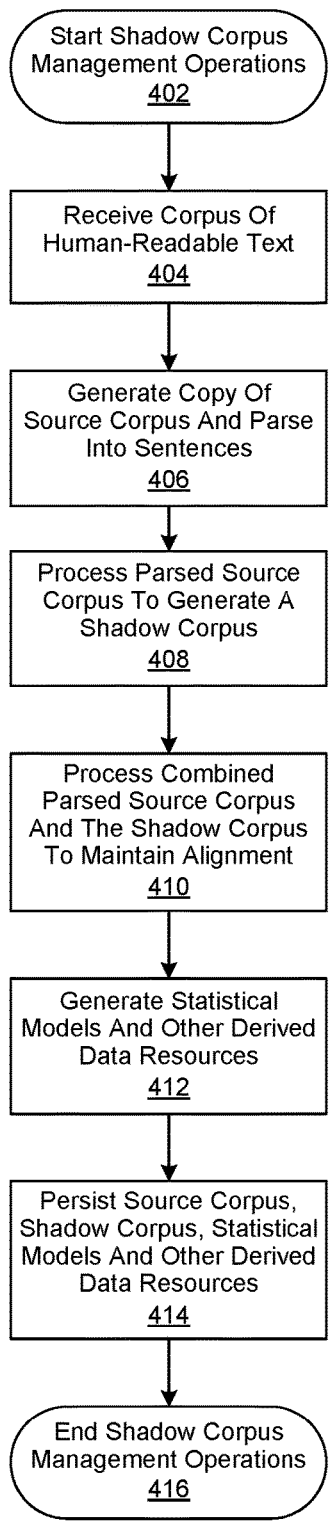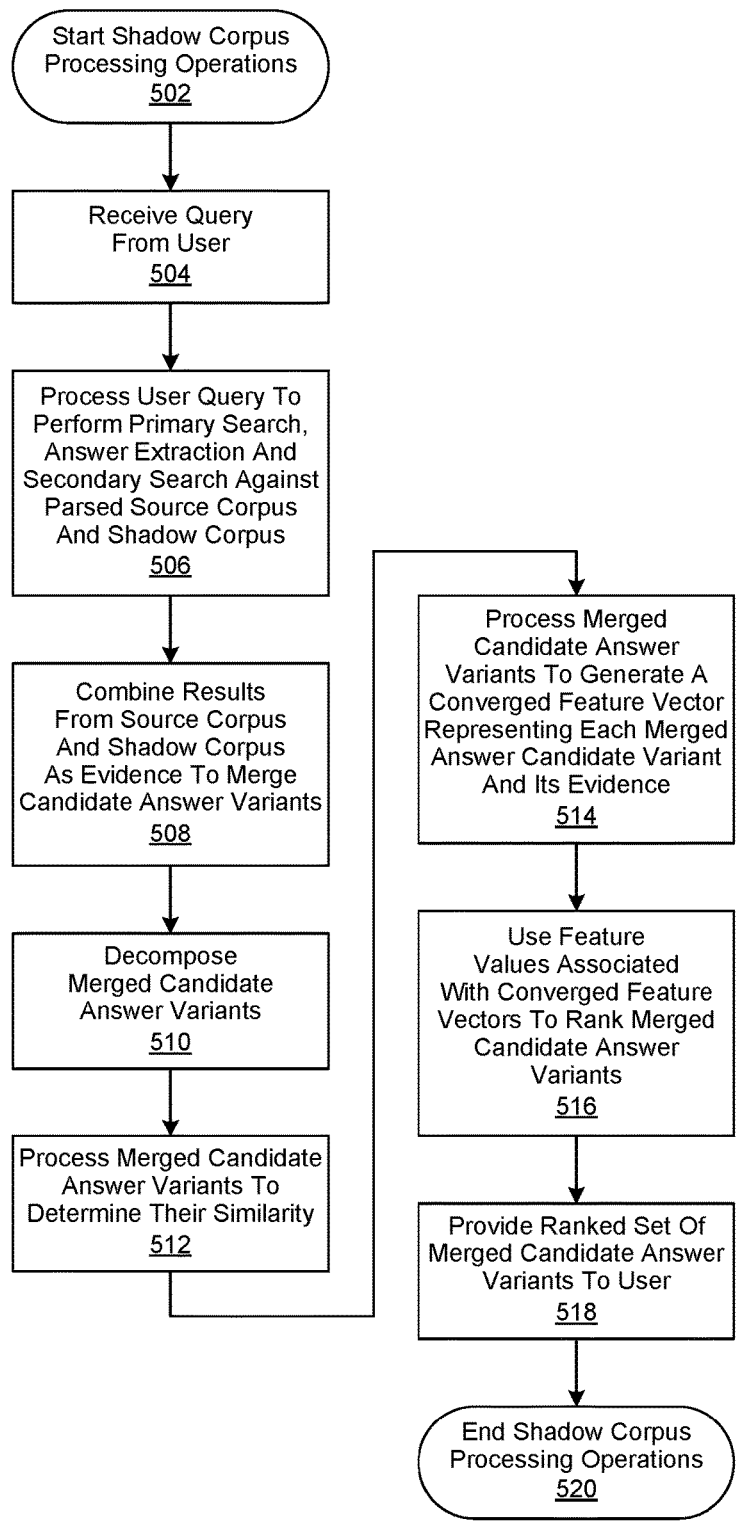
*Figure 4*  *Figure 5*

TEXT SIMPLIFICATION FOR A QUESTION AND ANSWER SYSTEM

BACKGROUND OF THE INVENTION

Field of the Invention

The present invention relates in general to the field of computers and similar technologies, and in particular to software utilized in this field. Still more particularly, it relates to a method, system and computer-usable medium for the use of a text simplification in a question answering (QA) system to improve ingestion quality and QA performance.

Description of the Related Art

In general, text simplification refers to the process of reducing the linguistic complexity of a corpus of human-readable text while retaining its original information content and meaning. As it relates to natural language processing (NLP), text simplification typically involves processes for modifying, enhancing, classifying, or otherwise processing such a corpus to simplify its grammar and structure. These text simplification processes may include operations for conceptual simplification, to simplify content and its form, elaborative modification, where key points are emphasized through redundancy and explicitness, and text summarization, to omit peripheral or inappropriate information.

It is not unusual for documents in many domains to contain lengthy, complex or obfuscated sentences that are challenging for question-answering (QA) system pipelines to work with. Examples of such documents include legal documents (e.g., SEC filings for municipal bonds), scientific journal documents, and project specifications. Unlike sentences typically found in these types of documents, user questions tend to be more targeted and convey only a focused few predicate/argument pairings of interest.

Accordingly, those questions may be difficult to align with answers within the corpus if the ingested material is overly complex. As an example, lengthy or complex sentences may overtax a parser's ability to determine structural relations, which results in a possible failure to extract predicate/argument pairs. Likewise, complex passages may result in recall failures due to terms from a user's query not being sufficiently proximate to one another in a given passage. For example, if the sentence contains a long parenthetical phrase, the subject and main verb of a sentence may be further apart than the word window allowed by either primary or secondary search.

SUMMARY OF THE INVENTION

A method, system and computer-usable medium are disclosed for the use of a text simplification in a question answering (QA) system to improve ingestion quality and QA performance. In various embodiments, a source corpus is processed to generate a parsed source corpus, which in turn is processed to generate a shadow corpus of simplified text. The parsed source corpus and the shadow corpus are then processed to generate derived data resources. In certain embodiments, the derived data resources may include statistical models, indexes for primary and secondary search, semantic frames, framecuts, fact stores, term occurrence statistics, term frequency-inverse document frequency (tf-idf) scores, sense frequency-inverse document frequency (sf-idf) scores, n-gram statistics, language models, or a combination thereof.

In various embodiments, a user query is processed by the QA system to generate a set of merged candidate answer variants. In these embodiments, the parsed source corpus, the shadow corpus, and the derived data resources are used by the QA system in the processing of the user query, which includes performing primary search, answer extraction, and secondary search operations. The resulting set of merged candidate answer variants are then processed to generate a corresponding converged feature vector representing each merged candidate answer variant. Feature values associated with each converged feature vector are then used to rank the merged candidate answer variants. A ranked set of merged candidate answer variants is then provided to the user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 is a generalized flowchart of the performance of shadow corpus management operations; and FIG. 5 is a generalized flowchart of the performance of shadow corpus processing operations.

DETAILED DESCRIPTION

Figure 1:
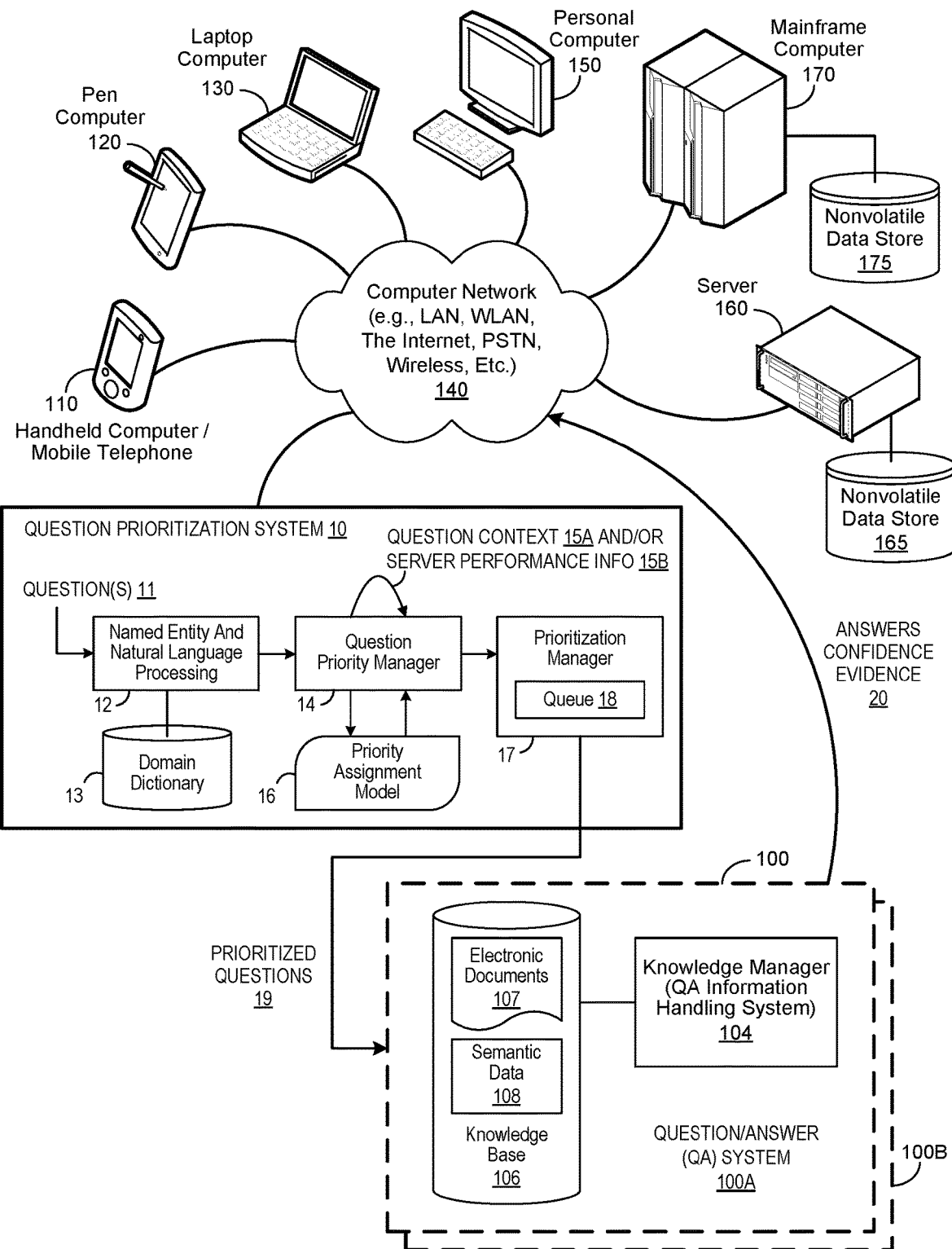
FIG. 1 depicts an exemplary client computer in which the present invention may be implemented.

A method, system and computer-usable medium are disclosed for the use of a text simplification in a question answering (QA) system to improve ingestion quality and QA performance. The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 104, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 13. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's Web Sphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a QA information handling system 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are dequeued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 107 or other data, a content creator, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 107 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
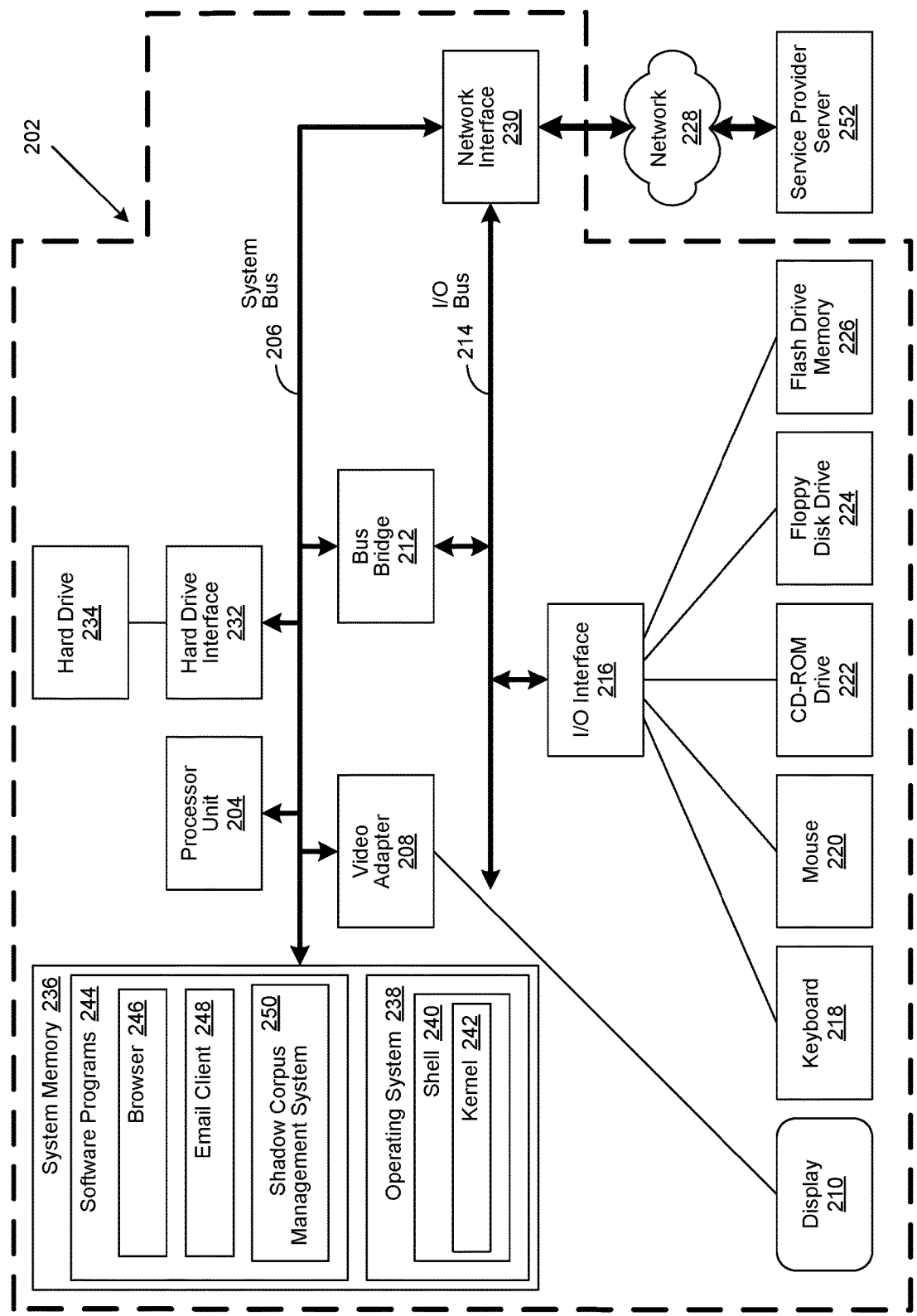
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a shadow corpus management system 250. In these and other embodiments, the shadow corpus management system 250 includes code for implementing the processes described hereinbelow. In one embodiment, information processing system 202 is able to download the shadow corpus management system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
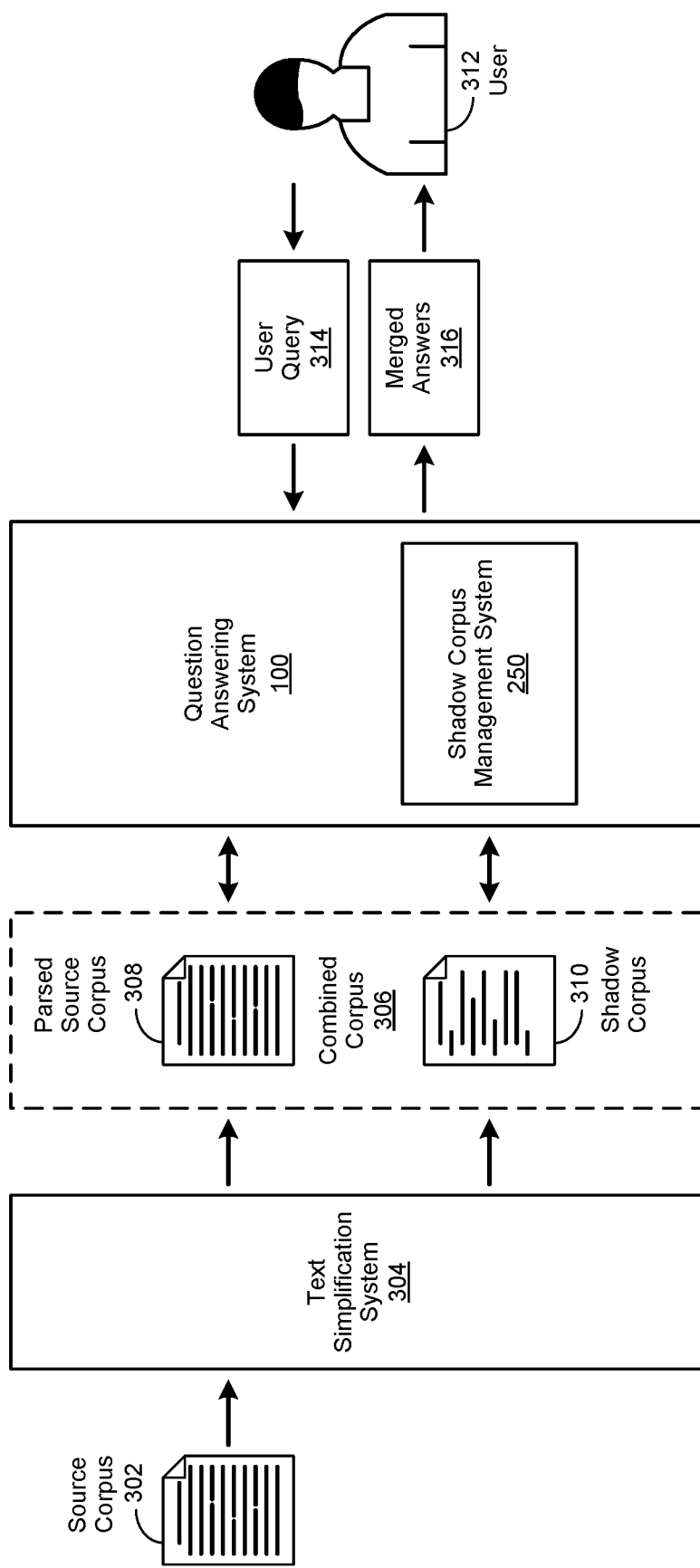
FIG. 3 is a simplified block diagram of a question answering (QA) system implemented with a shadow corpus management system.

FIG. 3 is a simplified block diagram of a question answering (QA) system implemented with a shadow corpus management system in accordance with an embodiment of the invention. As used herein, a shadow corpus 310 broadly refers to a source corpus 302 of human-readable text that has been simplified as a result of performance of text simplification operations by a text simplification system 304. As likewise used herein, such text simplification operations broadly refer to processes for modifying, enhancing, classifying, or otherwise processing such a source corpus 302 to simplify its grammar and structure. In various embodiments, text simplification processes may include operations for conceptual simplification, to simplify content and its form, elaborative modification, where key points are emphasized through redundancy and explicitness, and text summarization, to omit peripheral or inappropriate information. In certain embodiments, text simplification operations may likewise include within-sentence transformations to convert complex/obfuscated sentences into simpler structures that use more common vocabulary.

The resulting simplifications of a source corpus 302 may be structural, lexical, or both. Structural simplifications may include breaking multi-clause sentences into a sequence of simpler sentences, or moving a sentence-initial adverbial clause to the predicate. Lexical simplifications may include replacing terms with more common synonyms, replacing multi-word phrases with single-word equivalents, and replacing ellipsis with an overt noun phrase. In various embodiments, the performance of these text simplification operations typically results in reducing the linguistic complexity of a source corpus 302 while retaining its original information content and meaning.

In the context of a document retrieval capability, simplifying the source corpus 302 may result in more straightforward dependency structures. Likewise, content words may be moved closer to one another in the sentence, improving even basic search techniques such as word-window-based filtering of candidate answer passages. As a result, simplified text within a shadow corpus 310 may improve downstream text processes such as primary search, answer extraction, and so forth within QA or other document processing systems.

Those of skill in the art will be aware that it is not unusual for documents in many domains to contain lengthy, complex or obfuscated sentences that are challenging for QA system 100 pipelines to work with. Accordingly, those questions may be difficult to align with answers within the corpus if the ingested material is overly complex. As an example, lengthy or complex sentences may overtax a parser's ability to determine structural relations, which results in a possible failure to extract predicate/argument pairs. Likewise, complex passages may result in recall failures due to terms from a user query 314 not being sufficiently proximate to one another in a given passage.

For example, if a sentence contains a long parenthetical phrase, the subject and main verb of a sentence may be further apart than the word window allowed by either primary or secondary search. As another example, consider the following statement as a source corpus 302:

"Stationed outside of Paris during the First World War, American musician and army corporal Bill Turner was not sent with the rest of his battalion to fight in the Battle of the Somme."

Question: "Where was Bill Turner during WWI?"

Following are examples of shadow corpus 310 sentences that may be extracted from the source corpus 302, showing both lexical and structural simplification:

Bill Turner was near Paris in WWI.
Bill Turner was stationed near Paris.
Bill Turner was an American musician.
Bill Turner was a soldier.
Bill Turner was not sent to the Battle of the Somme.

While current text simplification approaches may reduce the amount of information within a source corpus 302, they may also result in the loss of critical information that would be of value in the operation of a QA system 100. Furthermore, it is possible that a primary search using the source corpus 302 may not return the right token window to produce the passage into the recall set such that an answer can be extracted. As a result, Logical Form Answer Candidate Scorer (LFACS) alignment between the question and answer may be hampered by the amount of additional information in the sentence. Conversely, it will likewise be appreciated that while text simplification operations may reduce the amount of presented information, they may also inadvertently lose critical information or return entailments other than the source corpus 302. Accordingly, it may be useful in a user-facing system to utilize the shadow corpus 310 in certain situations and display or process the source corpus 302 in others.

In various embodiments, a source corpus 302 is processed to generate a parsed source corpus 308, which is then linked to an associated shadow corpus 310 to improve system accuracy without losing details contained within the source corpus 302. In these embodiments, the ingestion process for a QA system 100 is modified to generate and utilize a shadow corpus 310 that has been simplified using text simplification approaches known to those of skill in the art. The parsed source corpus 308 and its associated shadow corpus 310 are then used by a QA system 100 for answer generation, answer and evidence scoring, and answer merging.

In certain embodiments, predetermined rules, based upon similarities between the answers and features values of answers resulting from the concurrent use of a parsed source corpus 308 and an associated shadow corpus 310 are used to generate merged answers 316, which are in turn provided to a user 312. The parsed source corpus 308 and an associated shadow corpus 310 are likewise used in various embodiments to overcome statistical modeling problems that may arise from text simplification by modifying algorithms that are typically used for calculating language model measurements. In certain embodiments, the QA system 100 may include a shadow corpus management system 250, which is used to manage a parsed source corpus 308 and an associated shadow corpus 310 during the performance of QA system 100 operations.

In various embodiments, performance of the aforementioned lexical and structural simplification operations will likely result in the shadow corpus 310 having significantly different term frequency-inverse document frequency (tf-idf) scores, n-gram statistics, and other measures than its associated parsed source corpus 308. As used herein, tf-idf scores broadly refer to numerical statistics that reflect the importance of a word in a corpus. As such, it is often used as a weighting factor in information retrieval and text mining. As likewise used herein, an n-gram broadly refers to a contiguous sequence of n items from a given sequence of text or speech. The items, which are typically collected from a parsed source corpus 308 or an associated shadow corpus 310, may be phonemes, syllables, letters, words or base pairs. As a result, scores relating to answers and evidence from the shadow corpus 310 will likely not be comparable to the feature values from its associated parsed source corpus 308.

Skilled practitioners of the art will be aware that current answer generation and scoring approaches performed within a QA pipeline may include operations similar to certain text simplification transformations. For example, synonyms to terms in a user query 314 are typically generated as part of query expansion in a primary search phrase. However, such approaches generally involve runtime processing, which can slow down overall response time of a QA system 100. To address this issue, these processes are performed in various embodiments during an offline ingestion phase.

For example, a user 312 may submit the following user query 314:

"What is multiple sclerosis?"

In response, a QA system 100 may generate the following, non-simplified answer from a parsed source corpus 308:

Multiple sclerosis (MS), also known as disseminated sclerosis or encephalomyelitis disseminate, is an inflammatory disease in which the insulating covers of nerve cells in the brain and spinal cord are damaged. This damage disrupts the ability of parts of the nervous system to communicate, resulting in a wide range of signs and symptoms, including physical, mental, and sometimes psychiatric problems. MS takes several forms, with new symptoms either occurring in isolated attacks (relapsing forms) or building up over time (progressive forms). Between attacks, symptoms may disappear completely; however, permanent neurological problems often occur, especially as the disease advances.

However, the following, simplified answer may be generated by a QA system 100 from a shadow corpus 310 generated during an offline ingestion phase:

Multiple sclerosis (MS) is a serious health condition that gets worse over time. In this disease, the body's natural guard against illness (the immune system) damages fatty coverings called myelin sheaths around the axons of cells called neurons in the central nervous system. The disease makes people's bodies, eyesight, speech, and minds work poorly. People with MS do not normally live as long as healthy people.

As another example, a user 312 may submit the following user query 314:

"What are the possible causes for multiple sclerosis?"

In response, a QA system 100 may generate the following, non-simplified answer from a parsed source corpus 308:

The cause of MS is unknown. However, it is believed to occur as a result of some combination of genetic and environmental infectious agents. Theories try to combine the data into likely explanations, but none have proved definitive. While there are a number of environmental risk factors and although some are partly modifiable, further research is needed to determine whether their elimination can prevent MS.

Likewise, the following, simplified answer may be generated by a QA system 100 from a shadow corpus 310 generated during an offline ingestion phase:

Scientists and doctors do not know for certain the cause of MS, but they think some things put people at a higher risk of MS:
   A person's genetics (the qualities they are born with)
   Too few vitamins in the body
   Too much stress in a person's life
   Smoking tobacco
   Being ill many times as a child
Research about the causes of MS is still incomplete. Some scientists think that one unknown pathogen (a small thing that causes illness) may cause MS in people who already have a high risk of getting the disease. Some viruses can cause myelin damage, and there are some viruses that have been shown to make people more likely to get MS. Even though scientists and doctors have many ideas about things that could cause MS, no one has found a cause that explains every case of the disease.

In various embodiments, shadow corpus 310 generation operations are initiated by receiving a corpus of human-readable text, such as a source corpus 302, for processing. The source corpus 302 is then processed by a text simplification system 304, familiar to those of skill in the art, to generate a parsed source corpus 308, which in turn is processed by the text simplification system 304 to generate a shadow corpus 310 of simplified text. In certain embodiments, multiple, simplified sentences in the shadow corpus 310 may be created from a single progenitor (i.e., original) sentence in the parsed source corpus 308. Likewise, multiple alternative variants of the simplified propositions may be generated in various embodiments. In certain embodiments, the non-simplified sentences contained in the parsed source corpus 308 and the simplified sentences contained in the shadow corpus 310 are logically associated with one another to generate a combined corpus 306 for ingestion by a QA system 100.

The combined corpus 306 is then processed to maintain bi-directional alignment between original parsed source corpus 308 units (e.g., clauses, sentences, etc.) and simplified shadow corpus 310 units such that a QA system 100 can access either version of the corpus from the other. In one embodiment, a document index engine, such as Apache Lucene, is configured such that whenever the index hits a text segment in either the parsed source corpus 308, or the shadow corpus 310, both versions of the text segment are returned in separate fields.

In another embodiment, the alignment may be maintained within a database or other persistent data store by assigning each unit in the shadow corpus 310 with the document ID and sentence number of its progenitor, parsed source corpus 308 and vice-versa. In yet another embodiment, stand-off annotation, such as an Unstructured Information Management Architecture (UIMA) annotation containing the alternate text, may be generated for use within a QA pipeline or other document processing pipeline. In yet still another embodiment, the parsed source corpus 308 or shadow corpus 310 text may also be carried as a UIMA annotation on the text of the alternate version corpus, in addition to creating the alternate simplified documents.

Statistical models and other derived data resources are then created for both the parsed source corpus 308 and shadow corpus 310, including indexes to be used in primary search, semantic frames and framecuts, word frequency statistics, n-grams, language models, and so forth. In various embodiments, skilled practitioners of the art will recognize that the shadow corpus 310, having undergone lexical simplification, is likely to contain tf-idf scores, n-gram statistics, and other measures that may be different from the parsed source corpus 308.

In various embodiments, statistics for document collections (e.g., an original source corpus 302 or parsed source corpus 308) typically include tf-idf scores, fact stores, term occurrence statistics, n-gram statistics, and so forth. Due to lexical simplifications, the document term frequency calculation in these embodiments may not be comparable between simplified shadow corpus 310 documents and parsed source corpus 308 documents. Instead of calculating statistics based on terms, a "sense" measurement is implemented in certain embodiments to analyze original and simplified text. As used herein, "sense" broadly refers to a set of one or more synonyms that are interchangeable within a given context without changing the truth value of the proposition in which they reside. One known example of "sense" is a synset, or synonym set, commonly used by the WordNet lexical database.

In certain embodiments, a sense frequency-inverse document frequency (sf-idf) value is computed for a term when it is discovered within a corpus. Skilled practitioners of the art will be aware that tf-idf weighting typically filters out common terms, which can adversely affect the term weighting accuracy for simplified text within a shadow corpus 310. In contrast, the use of sf-idf scoring approaches typically does not adversely affect term weighting for simplified text within a shadow corpus 310 due to its orientation to sets of synonyms.

Those of skill in the art will likewise be aware that n-gram measures may also be affected by text simplification. For example, the co-locations "apple pie" and "station wagon" will likely have a higher occurrence in common corpora than "apple pastry" and "station van." Accordingly, implementation of sf-idf word senses measurement approaches instead of tf-idf term weighting measurement approaches will be useful for n-grams as well, since the calculated measures will be equally analyzed for both original and simplified text. Once statistical models and other derived data resources are generated, they are persisted, along with the parsed source corpus 308 and the shadow corpus 310. The method by which the statistical models, other derived data resources, the parsed source corpus 308, and the shadow corpus 310 are persisted is a matter of design choice.

In various embodiments, shadow corpus 310 processing operations are initiated by a user query 314 being received by a QA system 100. In various embodiments, answers generated by the QA system 100 may be a factoid (a one term answer) or a passage (a full sentence or paragraph). In these embodiments, downstream processing performed by the QA system 100 is customized, depending upon which of these types the answer may be.

The user query 314 is then processed by the QA system 100 to perform primary search, answer extraction, and secondary search operations against both a parsed source corpus 308 containing original text and an associated shadow corpus 310 containing simplified text. In various embodiments, the parsed source corpus 308 and the shadow corpus 310 may be combined to generate a combined corpus 306 of both original and simplified text. In these embodiments, the primary search, answer extraction, and secondary search operations are performed against the combined corpus 306. The method by which the parsed source corpus 308 and the shadow corpus 310 are combined to generate a combined corpus 306 is a matter of design choice. In certain embodiments, the primary search operations are performed using a sense frequency-inverse document frequency (sf-idf) approach to determine weighted term relevance the query terms within the parsed source corpus 308 and the shadow corpus 310. In various embodiments, answer extraction and secondary evidence generation operations proceed normally, executing against both the parsed source corpus 308 and the shadow corpus 310, thereby avoiding potential loss of information loss commonly associated with QA processing of simplified text.

The results from the primary search, answer extraction, and secondary evidence generation operations are then combined as evidence to merge candidate answer variants. In various embodiments, equivalent answer variants from multiple sources are merged such that evidence for each distinct answer is accumulated across answer sources. In one embodiment, a QA system 100 utilizes custom merger routines for each answer type (e.g., numbers, dates, named entities, passages, etc.). In certain embodiments, the use of both a parsed source corpus 308 and a shadow corpus 310 may require customization of the merging process.

Merged candidate answer variants are then decomposed, followed by processing the decomposed merged candidate answer variants to determine their respective degree of similarity. In one embodiment, a first answer variant ($A_1$) and a second answer variant ($A_2$) are processed to determine their respective degree of similarity. In this embodiment, when $A_1$ and $A_2$ are being merged and they both come from the same level, whether from original or simplified evidence, answer similarity comparison operations proceed as normal, utilizing passage similarity scores such as skip bigram where appropriate. As used herein, a skip bigram broadly refers to a sequence of two adjacent elements in a string of tokens, such as letters, syllables, or words. For example, a bigram is an n-gram, where n=2. The frequency distribution of every bigram in a string is commonly used for simple statistical analysis of text in many applications, including in computational linguistics.

In another embodiment, if $A_1$ is a simplified passage and $A_2$ is its progenitor, they are considered to be equivalent, and double counting is eliminated by retaining only one version of evidence, whether it is original or simplified, based upon accuracy experiments known to those of skill in the art. In yet another embodiment, if $A_1$ is simplified text from a shadow corpus 310 and $A_2$ is original text from a parsed source corpus 308, and they are not aligned, the set of simplified sentences from $A_2$ is used to determine the merging of the $A_1$ answer and $A_2$ answer.

Merged candidate answer variants are then processed to generate a converged feature vector representing each merged answer 316 and its evidence. In one embodiment, feature values for merged answers 316 are generated by applying functions to the individual set of values of that feature across answer variants that were merged. For example, a numeric feature may utilize the MAX or SUM features. In various embodiments, novel merging functions may be implemented to reconcile feature values generated from different corpus levels. In another embodiment, any scoring that is affected by sentence length or number of predicates per sentence is normalized across the parsed source corpus 308 and the shadow corpus 310.

In yet another embodiment, different feature names are utilized to distinguish whether the answer/evidence came from the parsed source corpus 308 or the shadow corpus 310. For example, if there are two features in the vector to be scored, then simplified Logical Form Answer Candidate Scorer alignment (simplifiedLFACSalignment) may be used, and so forth. In yet still another embodiment, scores that rely upon valid structural analysis, such as Intra-Paragraph Anaphora Resolution (IPAR) or Logical Form Answer Candidate Scorer (LFACS) alignment, may be discounted if applied to an original document sentence in the source corpus 302 that could not be parsed.

The feature values associated with the converged feature vectors are then used to rank merged candidate answer variants. In various embodiments, the feature values are used in machine learning approaches familiar to those of skill in the art for the performance of scoring and ranking operations. The set of ranked merged candidate answer variants is then provided to the user 312 as one or more merged answers 316. The method by which the one or more merged answers 316 is determined is a matter of design choice.

In certain embodiments, the utilization of the shadow corpus 310 may be advantageous in certain cases but not others. In these embodiments, the one or more merged answers 316 provided to the user 312 may be based upon which top-ranked answer has a higher confidence score. In various embodiments, the one or more merged answers 316 provided to the user 312 may be based upon either the parsed source corpus 308, or the shadow corpus 310, according to the user's display size, reading level, age, domain expertise, and so forth. In certain embodiments, the one or more merged answers 316 provided to the user may be preferentially based upon the parsed source corpus 308 to counteract potential information loss associated with the shadow corpus 310 (i.e., loss of information resulting from the text simplification process). In various embodiments, factoid answers are likely to be supported from passages in both the parsed source corpus 308 and the shadow corpus 310. In these embodiments, a QA system 100 may show original text from the parsed source corpus 308, simplified text from the shadow corpus 310, or a heterogeneous mix of the two, sorted by evidence strength, and so forth.

FIG. 4 is a generalized flowchart of the performance of shadow corpus management operations implemented in accordance with an embodiment of the invention. In this embodiment, shadow corpus management operations are begun in step 402, followed by a source corpus of human-readable text being received in step 404 for processing. Parsing operations familiar to those of skill in the art are then performed on the source corpus in step 406 to generate a parsed source corpus. Text simplification processes are then performed on the parsed source corpus in step 408 to generate a shadow corpus of simplified text. The parsed source corpus and the shadow corpus are then combined in step 410 to generate a combined corpus, which is then processed to maintain bi-directional alignment between original parsed source corpus units (e.g., clauses, sentences, etc.) and simplified shadow corpus units such that a QA system can access either version of the corpus from the other.

Then, in step 412, statistical models and other derived data resources, described in greater detail herein, are created for both the parsed source corpus and the shadow corpus, including indexes to be used in primary and secondary search, semantic frames and framecuts, word frequency statistics, n-grams, language models, and so forth. Once statistical models and other derived data resources are generated in step 412, they are persisted in step 414, along with the parsed source corpus and the shadow corpus. The method by which the statistical models, other derived data resources, the parsed source corpus, and the shadow corpus are persisted is a matter of design choice. Shadow corpus management operations are then ended in step 416.

FIG. 5 is a generalized flowchart of the performance of shadow corpus processing operations implemented in accordance with an embodiment of the invention. In this embodiment, shadow corpus processing operations are begun in step 502, followed by a user query being received by a question answering (QA) system in step 504. In various embodiments, answers generated by the QA system may be a factoid (a one term answer) or a passage (a full sentence or paragraph). In these embodiments, downstream processing performed by the QA system is customized, depending upon which of these types the answer is.

In step 506, the user query is processed to perform primary search, answer extraction, and secondary search operations against both a parsed source corpus containing original text and an associated shadow corpus containing simplified text. In various embodiments, the parsed source corpus and the shadow corpus may be combined to generate a combined corpus of both original and associated simplified text. In these embodiments, the primary search, answer extraction, and secondary search operations are performed against the combined corpus. The method by which the source corpus and the shadow corpus are combined to generate a combined corpus is a matter of design choice.

The results from the operations performed in step 506 are then combined in step 508 as evidence to merge candidate answer variants. Merged candidate answer variants are then decomposed in step 510, followed by processing the decomposed merged candidate answer variants in step 512 to determine their respective degree of similarity. Then, in step 514, each merged candidate answer variant is processed to generate a converged feature vector representing the merged answer and its evidence. The feature values associated with the converged feature vectors generated in step 514 are then used in step 516 to rank merged candidate answer variants. A set of ranked merged candidate answer variants is then provided to the user in step 518 and shadow corpus processing operations are ended at step 520.

Although the present invention has been described in detail, it should be understood that various changes, substitutions and alterations can be made hereto without departing from the spirit and scope of the invention as defined by the appended claims.

What is claimed is:

1. A computer-implemented method for using text simplification in a question answering (QA) system, comprising:
   processing a source corpus to generate a parsed source corpus;
   processing the parsed source corpus to generate a shadow corpus, the shadow corpus comprising a simplified version of the source corpus, the simplified version of the source corpus comprising simplified grammar and structure of the source corpus, the simplified version of the source corpus being simplified by performance of a text simplification operation on the parsed source corpus, the text simplification operation performing a text simplification process, the text simplification process comprising conceptual simplification, elaborative modification and text summarization;
   processing the parsed source corpus and the shadow corpus to generate derived data resources for the parsed source corpus and derived data resources for the shadow corpus, the derived data resources for the parsed source corpus and the derived data resources for the shadow corpus being different as a result of the shadow corpus having undergone lexical simplification;
   processing a user query to generate a set of merged candidate answer variants;
   decomposing each of the merged candidate answer variants to provide decomposed merged candidate answers;
   processing the decomposed merged candidate answers to determine a respective degree of similarity among the decomposed merged candidate answers, the respective degree of similarity being based upon a skip bigram passage similarity score;
   processing the set of merged candidate answer variants to generate a converged feature vector representing each merged candidate answer variant;
   using feature values associated with each converged feature vector to rank the merged candidate answer variants; and
   providing a ranked set of merged candidate answer variants to the user.

2. The method of claim 1, wherein the processing of the user query comprises:
   primary search operations;
   answer extraction operations; and
   secondary search operations.

3. The method of claim 2, wherein the processing of the user query is performed by using:
   the parsed source corpus;
   the shadow corpus; and
   the derived data resources.

4. The method of claim 1, wherein the derived data resources include:
   statistical models;
   indexes for primary and secondary search;
   semantic frames;
   framecuts;
   fact stores;
   term occurrence statistics;
   term frequencyinverse document frequency (tf-idf) scores;
   sense frequency-inverse document frequency (sf-idf) scores;
   n-gram statistics; and
   language models.

5. The method of claim 1, wherein:
   bi-directional alignment is maintained between the parsed source corpus and the shadow corpus where alignment is maintained within a persistent data store by assigning each unit in the shadow corpus with a document ID and at least one of sentence number of a source corpus progenitor and a parsed source corpus.

6. The method of claim 1, wherein:
   the parsed source corpus and the shadow corpus are combined to generate a combined corpus of the parsed source corpus and the shadow corpus; and
   the combined corpus is processed to maintain bi-directional alignment between the parsed source corpus and the shadow corpus, the bi-directional alignment allowing the QA system to access the shadow corpus from the parsed source corpus and the parsed source corpus from the shadow corpus.

7. A system comprising:
a processor;
a data bus coupled to the processor; and
a computer-usable medium embodying computer program code, the computer-usable medium being coupled to the data bus, the computer program code used for using text simplification in a question answering (QA) system and comprising instructions executable by the processor and configured for:
processing a source corpus to generate a parsed source corpus;
processing the parsed source corpus to generate a shadow corpus, the shadow corpus comprising a simplified version of the source corpus, the simplified version of the source corpus comprising simplified grammar and structure of the source corpus, the simplified version of the source corpus being simplified by performance of a text simplification operation on the parsed source corpus, the text simplification operation performing a text simplification process, the text simplification process comprising conceptual simplification, elaborative modification and text summarization;
processing the parsed source corpus and the shadow corpus to generate derived data resources for the parsed source corpus and derived data resources for the shadow corpus, the derived data resources for the parsed source corpus and the derived data resources for the shadow corpus being different as a result of the shadow corpus having undergone lexical simplification;
processing a user query to generate a set of merged candidate answer variants;
decomposing each of the merged candidate answer variants to provide decomposed merged candidate answers;
processing the decomposed merged candidate answers to determine a respective degree of similarity among the decomposed merged candidate answers, the respective degree of similarity being based upon a skip bigram passage similarity score;
processing the set of merged candidate answer variants to generate a converged feature vector representing each merged candidate answer variant;
using feature values associated with each converged feature vector to rank the merged candidate answer variants; and
providing a ranked set of merged candidate answer variants to the user.

8. The system of claim 7, wherein the processing of the user query comprises:
primary search operations;
answer extraction operations; and
secondary search operations.

9. The system of claim 8, wherein the processing of the user query is performed by using:
the parsed source corpus;
the shadow corpus; and
the derived data resources.

10. The system of claim 7, wherein the derived data resources include:
statistical models;
indexes for primary and secondary search;
semantic frames;
framecuts;
fact stores;
term occurrence statistics;
term frequency-inverse document frequency (tf-idf) scores;
sense frequency-inverse document frequency (sf-idf) scores;
n-gram statistics; and
language models.

11. The system of claim 7, wherein:
bi-directional alignment is maintained between the parsed source corpus and the shadow corpus where alignment is maintained within a persistent data store by assigning each unit in the shadow corpus with a document ID and at least one of sentence number of a source corpus progenitor and a parsed source corpus.

12. The system of claim 7, wherein:
the parsed source corpus and the shadow corpus are combined to generate a combined corpus of the parsed source corpus and the shadow corpus; and
the combined corpus is processed to maintain bi-directional alignment between the parsed source corpus and the shadow corpus, the bi-directional alignment allowing the QA system to access the shadow corpus from the parsed source corpus and the parsed source corpus from the shadow corpus.

13. A non-transitory, computer-readable storage medium embodying computer program code, the computer program code comprising computer executable instructions configured for:
processing a source corpus to generate a parsed source corpus;
processing the parsed source corpus to generate a shadow corpus, the shadow corpus comprising a simplified version of the source corpus, the simplified version of the source corpus comprising simplified grammar and structure of the source corpus, the simplified version of the source corpus being simplified by performance of a text simplification operation on the parsed source corpus, the text simplification operation performing a text simplification process, the text simplification process comprising conceptual simplification, elaborative modification and text summarization;
processing the parsed source corpus and the shadow corpus to generate derived data resources for the parsed source corpus and derived data resources for the shadow corpus, the derived data resources for the parsed source corpus and the derived data resources for the shadow corpus being different as a result of the shadow corpus having undergone lexical simplification;
processing a user query to generate a set of merged candidate answer variants;
decomposing each of the merged candidate answer variants to provide decomposed merged candidate answers;
processing the decomposed merged candidate answers to determine a respective degree of similarity among the decomposed merged candidate answers, the respective degree of similarity being based upon a skip bigram passage similarity score;
processing the set of merged candidate answer variants to generate a converged feature vector representing each merged candidate answer variant;
using feature values associated with each converged feature vector to rank the merged candidate answer variants; and
providing a ranked set of merged candidate answer variants to the user.

14. The non-transitory, computer-readable storage medium of claim 13, wherein the processing of the user query comprises:

primary search operations;
answer extraction operations; and
secondary search operations.

15. The non-transitory, computer-readable storage medium of claim 14, wherein the processing of the user query is performed by using:
the parsed source corpus;
the shadow corpus; and
the derived data resources.

16. The non-transitory, computer-readable storage medium of claim 13, wherein the derived data resources include:
statistical models;
indexes for primary and secondary search;
semantic frames;
framecuts;
fact stores;
term occurrence statistics;
term frequency-inverse document frequency (tf-idf) scores;
sense frequency-inverse document frequency (sf-idf) scores;
n-gram statistics; and
language models.

17. The non-transitory, computer-readable storage medium of claim 13, wherein:
bi-directional alignment is maintained between the parsed source corpus and the shadow corpus where alignment is maintained within a persistent data store by assigning each unit in the shadow corpus with a document ID and at least one of sentence number of a source corpus progenitor and a parsed source corpus.

18. The non-transitory, computer-readable storage medium of claim 13, wherein:
the parsed source corpus and the shadow corpus are combined to generate a combined corpus of the parsed source corpus and the shadow corpus; and the combined corpus is processed to maintain bi-directional alignment between the parsed source corpus and the shadow corpus, the bi-directional alignment allowing the QA system to access the shadow corpus from the parsed source corpus and the parsed source corpus from the shadow corpus.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *